United States Patent [19]

Wiseman et al.

[11] Patent Number: 4,994,914

[45] Date of Patent: Feb. 19, 1991

[54] COMPOSITE VIDEO IMAGE DEVICE AND RELATED METHOD

[75] Inventors: John Wiseman, Rio Rancho; Ken Correll; Paul Brooks, both of Albuquerque, all of N. Mex.

[73] Assignee: Digital Equipment Corporation, Maynard, Mass.

[21] Appl. No.: 453,132

[22] Filed: Dec. 12, 1989

Related U.S. Application Data

[63] Continuation of Ser. No. 209,608, Jun. 21, 1988, abandoned.

[51] Int. Cl.[5] .............................................. H04N 5/14
[52] U.S. Cl. ...................................... 358/160; 358/22; 358/183
[58] Field of Search ...................... 358/140, 11, 13, 17, 358/19, 149, 160, 181, 183, 22, 148

[56] References Cited

U.S. PATENT DOCUMENTS

| | | | |
|---|---|---|---|
| 4,007,486 | 2/1977 | Inaba et al. | 358/13 |
| 4,018,990 | 4/1977 | Long et al. | 358/149 |
| 4,148,070 | 4/1979 | Taylor | 358/160 |
| 4,218,710 | 8/1980 | Kishigi et al. | 358/183 |
| 4,276,565 | 6/1981 | Dalton et al. | 358/140 |
| 4,539,585 | 9/1985 | Spackova et al. | |
| 4,591,897 | 5/1986 | Edelson | |
| 4,599,611 | 7/1986 | Bowker et al. | |
| 4,602,286 | 7/1986 | Kellar et al. | 358/183 |
| 4,621,259 | 11/1986 | Schepers et al. | |
| 4,644,401 | 2/1987 | Gaskins | |
| 4,743,958 | 5/1988 | Bannister et al. | 358/181 |
| 4,800,430 | 1/1989 | Murakami et al. | 358/181 |

OTHER PUBLICATIONS

Butler, Robert J., "Operational Implementation of a Broadcast Television Frame Synchronizer", SMPTE, vol. 84, #3, 3/75, pp. 125-134.

Primary Examiner—James J. Groody
Assistant Examiner—David E. Harvey
Attorney, Agent, or Firm—Finnegan, Henderson, Farabow, Garrett, and Dunner

[57] ABSTRACT

A composite video imaging device and related method are provided wherein a first and a second video signal, each of which respresents a plurality of lines of video data, are received and converted into corresponding first and second pixel data signals. The first and second pixel data signals are stored by a first and second storage means at a first and a second frequency, respectively, the loading of the first and second pixel data signals occurring independent of one another to permit the first and second pixel data signals to correspond to first and second video signals with different line and/or frame frequenices. Control means are provided for selecting the first or the second pixel data signal for each pixel to be displayed on a monitor and for delivering each selected pixel data signal to the monitor for display of a resultant composite video image.

12 Claims, 5 Drawing Sheets

COMPOSITE VIDEO IMAGE DEVICE AND RELATED METHOD

This is a continuation-in-part of application Ser. No. 07/209,608, filed Jun. 21, 1988, now abandoned.

BACKGROUND OF THE INVENTION

1. Field of the Invention

The invention relates generally to a method and apparatus for providing a composite video image for display on a monitor, and specifically to a method and apparatus which permit first and second video signals having different line and/or frame frequencies to be selectively displayed on the monitor.

2. Background Information

In previously known systems, in order for a video signal having a first frequency to be delivered to a monitor for display at a second frequency of the first frequency, it is necessary to use two different memory units. While the video signal is being written into the first memory unit at the first frequency, the video signal is being read from the second memory unit at the second frequency. Similarly, while the video signal is being written into the second memory unit at the first frequency, the video signal is being read from the first memory unit at the second frequency. An example of such a device is given below.

These known systems, however, require that the second or output frequency be equal to, or a multiple of, first or input frequency so that the frequency of the output video signal will be synchronized to the frequency of the input video signal. As a result, such previously known systems could not be used to display a composite video image of two or more asynchronous video signals on a monitor.

SUMMARY OF THE INVENTION

Accordingly, it is an object of the present invention to provide a video device which permits the simultaneous display of a composite video image of two or more asynchronous video signals.

It is a further object of the present invention to provide a video device for displaying a composite video image on a monitor which requires a minimum amount of memory.

Additional objects and advantages of the invention will be set forth in part in the description which follows, and in part will be obvious from the description, or may be learned by practice of the invention.

To achieve the objects and in accordance with the purpose of the invention, as embodied and broadly described herein, there is provided, for display on a monitor, a composite video image formed from first and second video signals. The video device comprises means for receiving the first and second video signals, each representing a plurality of lines of video data; means for converting the first video signal into first pixel data signals and a control signal, and for converting the second video signal into second pixel data signals; first and second storage means for storing the first and second pixel data signals, respectively; first and second loading means for independently loading the first and second pixel data signals, respectively, into the first and second storage means, respectively, at first and second frequencies corresponding respectively to the first and second pixel data signals; output means, coupled to the first and second storage means, for forming an output signal representing the composite video image from portions of the first and second pixel data signals selected according to the control signal; and control means, coupled to the output means, for causing the output means to form the output signal by selecting the first and second pixel data signal for each pixel to be displayed as the composite video image on the monitor and for generating the timing control signal. The first loading means operates independently of the second loading means, and the output signal has an output frequency set according to a timing control signal which is independent of at least one of the first and second frequencies.

The accompanying drawings, which are incorporated in and constitute a part of the specification, illustrate one embodiment of the invention and, together with the description, serve to explain the principles of the invention.

DETAILED DESCRIPTION OF THE PREFERRED EMBODIMENT

Reference will now be made to the present preferred embodiment of the invention, an example of which is illustrated in the accompanying drawings.

Figure 1:
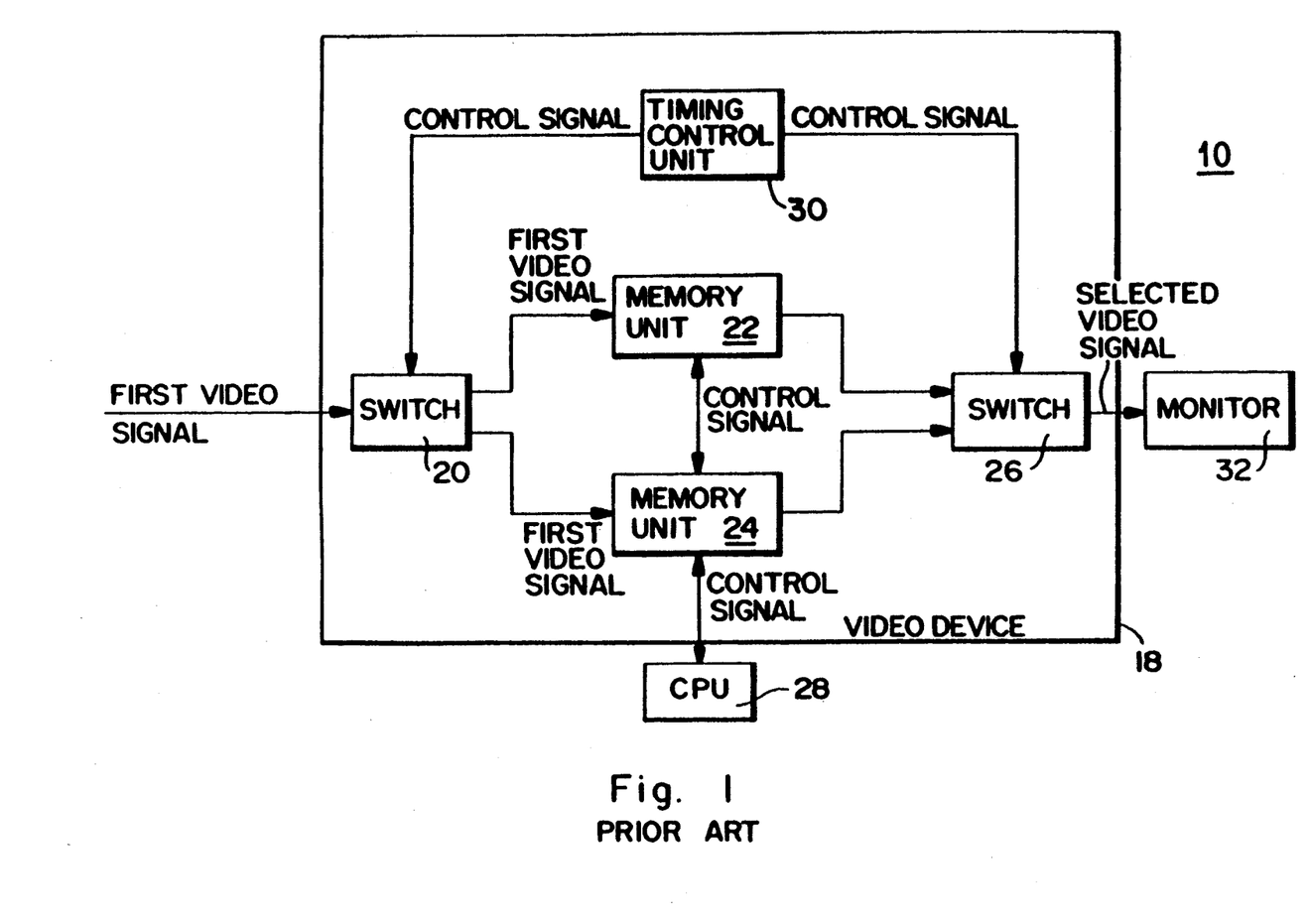
FIG. 1 is a block diagram of the major components of a known video device.

FIG. 1 is a block diagram of a known video image display system of the type described above. Display system 10 includes a central processing unit (CPU) 28, a video device 18 and a monitor 32. Video device 18 includes a first switch 20, a first memory unit 22, a second memory unit 24, a second switch 26, and a timing control unit 30. First and second memory units 22, 24 are coupled to one another and to first and second switches 20, 26. Timing control unit 30 is coupled to each of first and second switches 20, 26 and supplies control signals thereto. A first video signal is input into first switch 20, in response to the control signal from timing control unit 30, alternately directs that video signal to first memory unit 22 and second memory unit 24. The stored first video signal is subsequently read from first memory unit 22 and second memory unit 24 via second switch 26 and output to monitor 32. Also applied to second memory unit 24 is a control signal from CPU 28.

Timing control unit 30 generates control signals so that as the first video signal is being written to first memory unit 22, a previously stored portion of the first video signal is read from second memory unit 21. Similarly, while the first video signal is being written to second memory unit 24, another previously stored portion of the first video signal is read from first memory unit 22. The timing of the writing to and reading from first and second memory units 22, 24 is controlled by timing control unit 30 via the application of control signals to first switch 20 and second switch 26. The video signal selected from memory units 22 and 24 by second switch 26 is passed to monitor 32. CPU 28 passes a control signal to second memory unit 24 which, in turn, may pass the control signal to first memory unit 22.

Because the video image display system illustrated in FIG. 1 requires both first and second memory units 22, 24, the amount of memory required by such a configuration is generally twice that required in systems using only a single memory unit to receive, store, and output a video signal. Moreover, the video image display system illustrated in FIG. 1 requires that the frequencies of the video signal, control signal, and selected video signal be synchronous because of the complementary use of the first and second memory units. This requirement of synchronicity severely restricts operation of the system in the manner described above.

Figure 2:
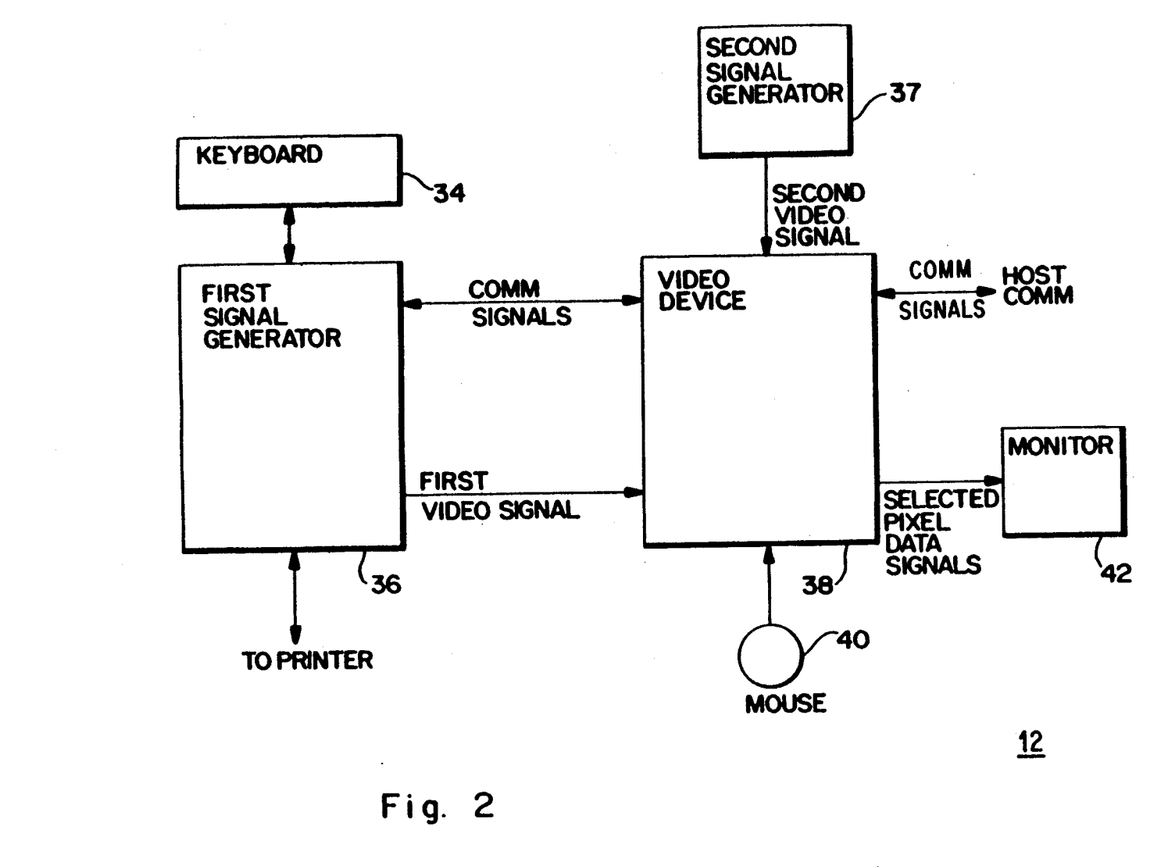
FIG. 2 is a block diagram of the major components of a video image display system incorporating the teachings of the present invention.

FIG. 2 illustrates a block diagram of a video image display system incorporating the teachings of the present invention. As illustrated in FIG. 2, video image display system 12 includes a keyboard 34, a first signal generator 36, a second signal generator 37, a video device 38, a mouse 40, and a monitor 42. Keyboard 34 is coupled to first signal generator 36 and passes user inputs thereto. First signal generator 36 is also coupled to a printer (not shown) and to video device 38. Communication signals are passed from first signal generator 36 to video device 38 and from video device 38 to first signal generator 36. Also passed from first signal generator 36 to video device 38 is a first video signal. A second video signal is passed to video device 38 from second signal generator 37. Video device 38 is also coupled to mouse 40 from which user inputs may be received, to a host computer (not shown) to which communication signals may be sent and received, and to monitor 42 which receives selected pixel data signals from video device 38. The function of video device 38 will now be described in connection with FIGS. 3–5.

Figure 3:
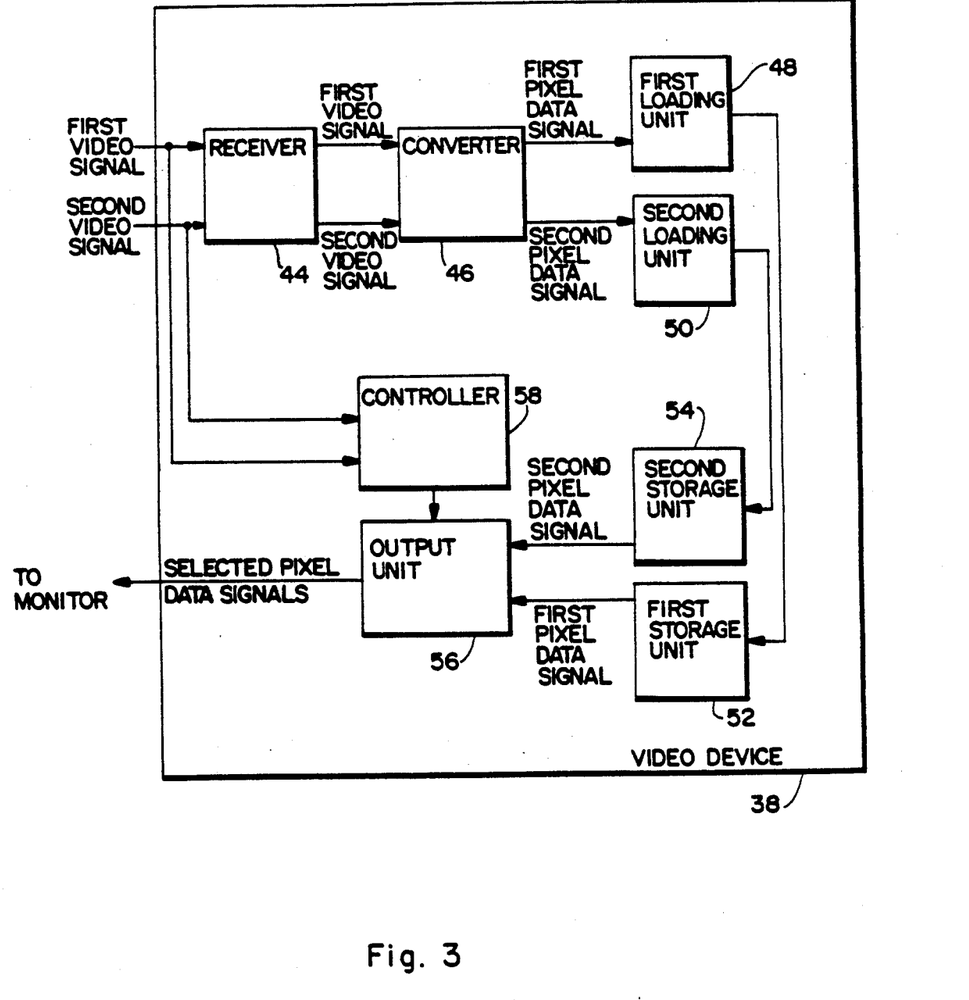
FIG. 3 is a conceptual block diagram of the configuration of a video device used by the video image display system of FIG. 2.

FIG. 3 illustrates a block diagram of video device 38. As shown therein, video device 38 includes a receiver 44, a converter 46, a first loading unit 48, a second loading unit 50, a first storage unit 52, a second storage unit 54, an output unit 56, and a controller 58.

Receiver 44 receives a first video signal from first signal generator 36 (shown in FIG. 2) and a second video signal from second signal generator 37 (shown in FIG. 2). The first video signal and second video signal are output from receiver 44 to converter 46 which covers the first and second video signals to corresponding first and second pixel data signals, respectively. The first and second pixel data signals are inputs to first loading unit 48 and second loading unit 50, respectively. The first and second pixel data signals are output from first and second loading units 48 and 50, respectively, to first and second storage units 52, 54 respectively. The first and second pixel data signals, respectively are stored in first storage unit 52 and second storage unit 54, respectively, are output to output unit 56. Also connected to output unit 56 is controller 58 which also monitors the first and second video signals. Output unit 56 outputs selected pixel data signals to monitor 42.

The first and second video signals each represent a plurality of lines of video data. The first and second video signals may have asynchronous frequencies, which means that the line and/or frame frequencies of the first and second video signals need not be multiples of each other, but rather may be independent of one another. The first and second video signals are passed from receiver 44 to converter 46 where they are converted to digital signals. The conversion is preferably accomplished by sampling the first and second video signals at frequencies corresponding to the first and second video signals respectively, to enable generation of first and second pixel data signals having different line and/or frame frequencies.

The first and second pixel data signals are then passed through first loading unit 48 and second loading unit 50, respectively. Each of the loading units 48,50 preferably comprises a plurality of input shift registers for loading the first and second pixel data signals into first storage unit 52 and second storage unit 54, respectively at first and second frequencies, respectively. First loading unit 48 and second loading unit 50 operate independently of one another to permit the first and second pixel data signals, corresponding to the first and second video signals, respectively, and have independent line and/or frame frequencies.

As the first and second video signals are stored in the first storage unit 52 and second storage unit 54, respectively, output unit 50 removes the first and second pixel data signals from first storage unit 52 and second storage unit 54 at an output frequency is; set independent of at least one of the first and second frequencies of the first and second pixel data signals.

As the first and second pixel data signals are removed from storage units 52,54, they form an output signal labelled "Selected Pixel Data Signals" in Fig. 3. The output is used for display of a resultant composite video image on monitor 42. To generate the output signal, controller 58 passes control signals to output unit 56 to select the first or the second pixel data signal from output unit 56 for each pixel to be displayed on monitor 42. Controller 58 generates the control signals using the first and second video signals.

Figure 4:
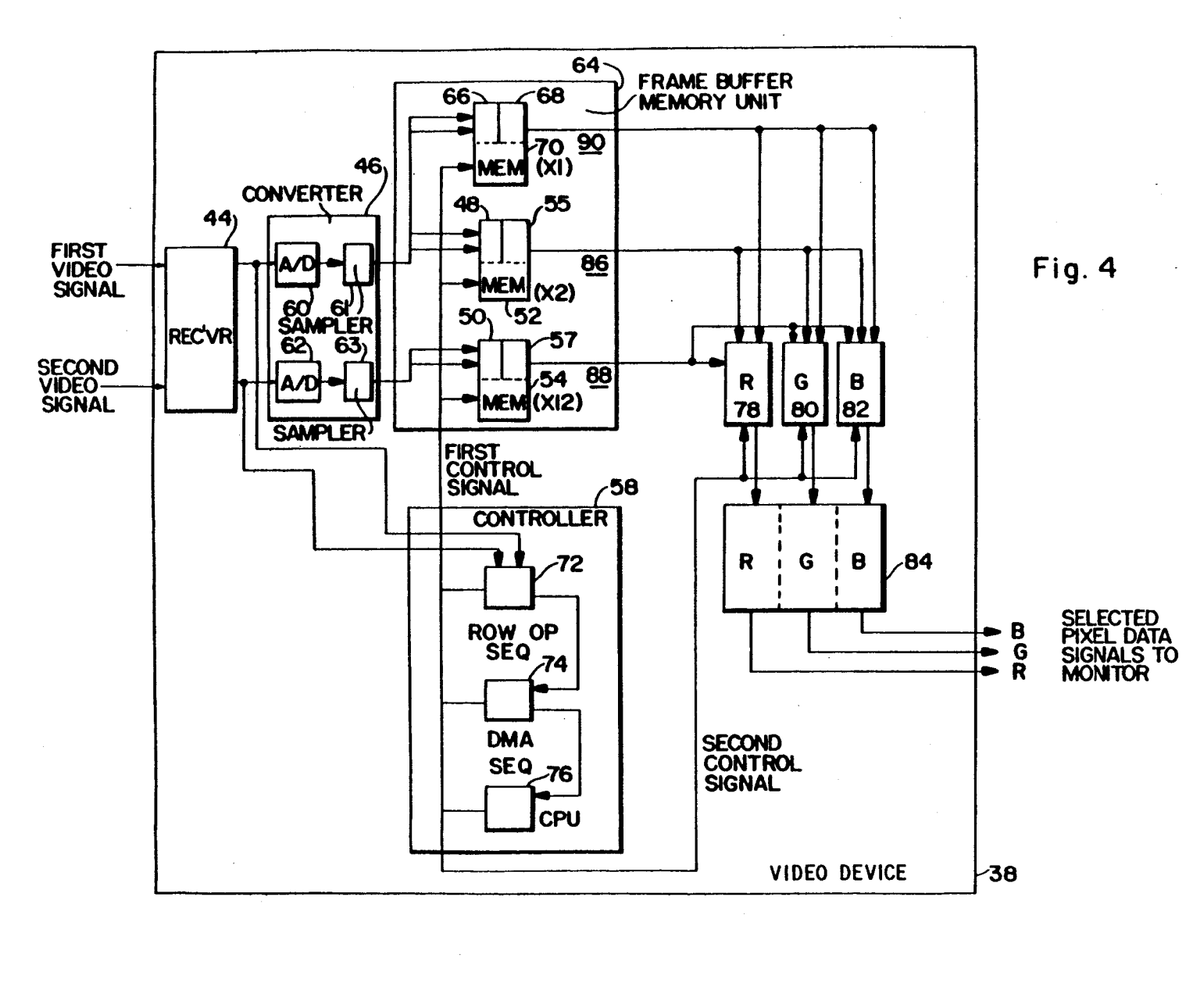
FIG. 4 is a more detailed block diagram of the conceptual configuration shown in FIG. 3.

FIG. 4 is a more detailed block diagram of the present preferred embodiment of video device 38. Certain specific areas of correspondence between FIGS. 3 and 4 will be set forth in the following description. As shown therein, video device 38 includes receiver 44, converter 46, and controller 58, as shown in FIG. 3. Device 38 also preferably includes a frame buffer memory unit 64, having load units 48, 60 as well as unloading units 52, 54 shown in FIG. 3. In addition, video device 30 in FIG. 4 includes a red, a green, and a blue look-up table 78, 80, 82, respectively, and a triple digital-to-analog (D/A) converter 84 coupled to tables 78, 80, 82. Preferably output unit 56 in FIG. 3 includes unloading units 55, 57, tables 78, 80, 82, and D/A converter 84 in FIG. 4.

As shown in FIG. 4, converter 46 includes a first analog-to-digital (A/D) converter 60, a first sampler 61, a second A/D converter 62, and a second sampler 63. Frame buffer memory unit 64 includes first, second, and third loading units 48, 60, 66 respectively, first second and third storage units 52, 54, 70, respectively, and first, second, and third unloading units, 55, 57, 68, respectively. Controller 58 includes a row operation sequencer 72, a direct memory access (DMA) sequencer 74, and a central processing unit (CPU) 76.

The first and second video signals from receiver 44 are passed to first and second A/D converters 60, 62, respectively, in converter 46. A/D converters 60, 62 digitize the respective video signals which are passed to first and second sampler 61, 63, respectively. Samplers 61, 63 sample the respective digitized video signal at independent sampling rates. Preferably, the rates of samplers 61 and 63 are set so that the same number of samples is obtained for each line of video of both the first and second video signals. Thus, the sampling rates are preferably determined in accordance with the frequency of the respective first and second video signals.

The sampled signals are passed to first and second loading units 48 and 50, respectively of frame buffer memory unit 64. First and second loading units 48 and 50 pass the pixel data signals to first and second storage units 52 and 54, respectively which in turn pass the pixel data signals to first and second unloading units 55 and 57, respectively.

The first video signal, like the second video signal, normally contains video data representative of an image to be displayed However, on occasion the first video signal comprises pixel control data. Pixel control data includes specifying mask data for each pixel location, whether the displayed pixel for that location will come from the first video signal or the second video signal. When control video data is received, the output of sampler 61 is directed to loading unit 66 instead of loading unit 48. Loading unit 66, storage unit 70 and unloading unit 68 operate on the control video data of the first video signal in the same manner that loading unit 48, storage unit 52 and unloading unit 68 operate on the normal video data of the first video signal.

Preferably, the frame buffer is constructed as a plurality of planes of integrated circuits. The first loading unit 48, first storage unit 52, and first unloading unit 55, together comprise a first set of planes 86. Similarly, second loading unit 50, second storage means 54, and second unloading unit 57 together comprise a second set of planes 88 and third loading unit 66, third storage unit 70, and third unloading unit 68 together comprise a third set of planes 90.

First, second, and third set of planes 86, 88, 90 receive, store, and unload the pixel data and pixel control signals output from converter 46. Each plane comprises at least one integrated circuit chip on which the respective loading, storage and unloading units are provided. An example of a satisfactory integrated circuit chip may be found in U.S. patent application Ser. No. 06/571,991 filed Jan. 19, 1984, entitled "A Multiport Memory And Source Arrangement For Pixel Information," now abandoned in favor of Ser. No. 07/068,728, filed Jun. 29, 1987, the contents of which are incorporated herein by reference. The configuration of sets of planes 86, 88, 90 will be discussed in detail below in connection with FIG. 5.

In the preferred embodiment, the first and second video signals are also passed from the output of receiver 44 to controller 58 inputs of row operation sequencer 72. From the first and second video signals, row operation sequencer 72, DMA sequencer 74, and CPU 76 operate to output a first control signal to first, second and third storage units 52, 54 and 70, respectively and a second control signal to red, green, and blue look-up tables 78, 80, 82. The first control signal controls the frequencies with which the first and second pixel data signals are unloaded by unloading units 55, 57, 68. Accordingly, the unloading of the pixel data and control signals can occur at a frequency set independently of the frequencies at which the first and second pixel data or control signals were loaded into storage units 52, 54 and 70.

The pixel data or pixel control signals output from first, second, and third unloading units 55, 57, 68, respectively are passed to inputs of red, green, and blue look-up tables 78, 80, 82, respectively. The pixel data and control signals, controlled by the second control signal output from controller 58, are correlated with known color values stored in the look-up tables. The red, green and blue signals output from look-up tables 78, 80, 82 respectively identify specific red, green, and blue color components to be displayed at each particular pixel location. The outputs from tables 78, 80, 82 are passed to inputs of triple D/A converter 84 which outputs selected pixel data signals to monitor 32. The pixel control signals from third unloading unit 68 are used in tables 78, 80, 82 to select for each pixel location either the first or the second pixel data signal.

Figure 5:
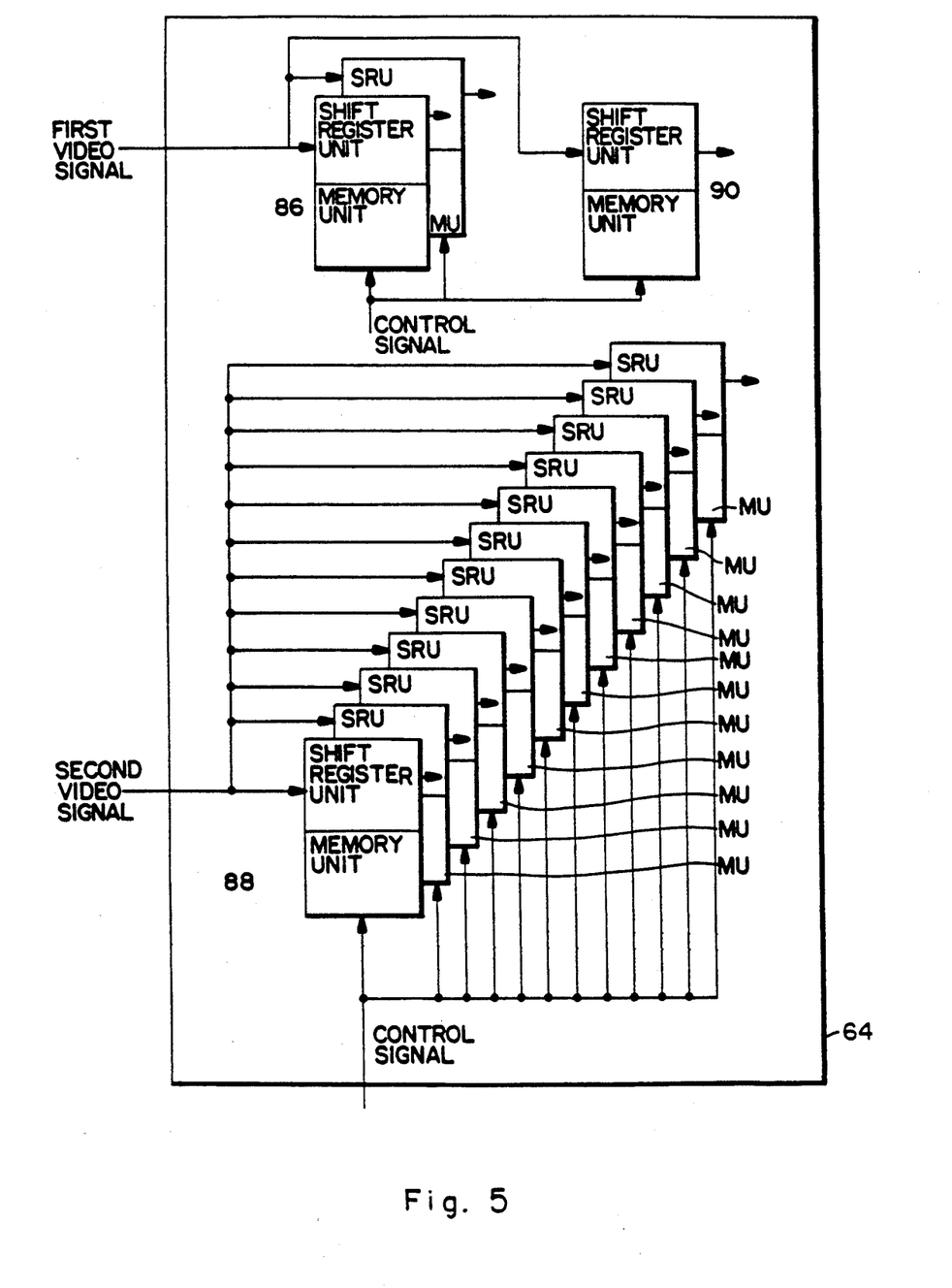
FIG. 5 is a detailed block diagram of the frame buffer memory unit of FIG. 4.

FIG. 5 is a detailed illustration of frame buffer memory unit 64. As shown therein, memory unit 64 comprises first, second and third sets of planes 86, 88, 90, respectively. Because the loading units and unloading units illustrated in FIG. 4 comprise a plurality of input and output shift registers, the loading units and unloading units are identified, where appropriate in FIG. 5, as a shift register unit. Each shift register unit and memory unit comprises at least one integrated circuit chip. Depending upon the storage contraints of the integrated circuit chip used, it may be necessary to configure a plurality of integrated circuit chips into a cascaded formation to achieve storage capabilities consistent with the display capabilities of monitor 32. For example, four integrated circuit chips connected in series may be used for a particular embodiment.

FIG. 5 illustrates a configuration of frame buffer memory unit 64 wherein first set of planes 86 comprises a pair of integrated circuit chips. The first pixel data signal input to first plane 86 is received by the loading units of the shift register units of each integrated circuit chip and is stored by the respective memory units. Separate integrated circuit chips are provided to load, store, and unload separate bits of the first and second pixel data signals. For example, second set of planes 88 may comprise twelve planes of four integrated circuit chips cascaded in series to load, store, and unload the red, green and blue color components of the second pixel data signal. Third set of planes 90 preferably comprises a single plane of integrated circuit chips cascaded in series for storing mask data corresponding to each pixel to be displayed on monitor 32.

It will be apparent to those skilled in the art that various modifications and variations can be made in the apparatus and method of the present invention without departing from the spirit or scope of the invention. Other embodiments of the invention will be apparent to those skilled in the art from consideration of the specification and practice of the invention. It is intended that the specification and examples described herein be considered as exemplary only, with a true scope and spirit of the invention being indicated by the following claims and their equivalents.

What is claimed is:

1. A video device for providing, for display on a monitor, a composite video image formed from first and second video signals, said video device comprising:
    (a) means for receiving said first and second video signals, each of said first and second video signals representing a plurality of lines of video data;
    (b) means for converting said first video signal into first pixel data signals and a control signal and for converting said second video signal into second pixel data signals;
    (c) first and second storage means for storing said first and second pixel data signals, respectively;

(d) first and second loading means for independently loading said first and second pixel data signals, respectively, into said first and second storage means, respectively, at first and second frequencies corresponding respectively to said first and second pixel data signals, said first loading means thereby operating independently of said second loading means;

(e) output means, coupled to said first and second storage means, for forming an output signal representing said composite video image from portions of said first and second pixel data signals selected according to said control signal, said output signal having an output frequency set according to a timing control signal which is independent of at least one of said first and second frequencies; and (f) control means, coupled to said output means for causing said output means to form said output signal by selecting said first or said second pixel data signal for each pixel to be displayed as said composite video image on said monitor and for generating said timing control signal.

2. A video device according to claim 1, wherein said converting means comprises a first and a second analog-to-digital convertor for converting said first and second video signals to first and second digital video signals, respectively, and first and second sampling means, operating independently, for sampling said first and second digital video signals at independent frequencies to enable generation of said first and second pixel data signals having different line and/or frame frequencies.

3. A video device according to claim 1, wherein at least a portion of said first storage means, said first loading means, and said first unloading means are provided on the same integrated circuit chip.

4. A video device according to claim 3, wherein at least a portion of said second storage means, said second loading means, and said second unloading means are provided on the same integrated circuit chip.

5. A video device according to claim 1, wherein said first storage means, said first loading means, and said first unloading means are provided on a total of four identical integrated circuit chips connected in series, each of which includes a portion of said first storage means, said first loading means, and said first unloading means.

6. A video device according to claim 5, wherein said second storage means, said second loading means, and said second unloading means are provided on a total of four identical integrated circuit chips connected in series, each of which includes a portion of said first storage means, said first loading means, and said first unloading means.

7. A video device according to claim 1, further comprising means, coupled between said receiving means and said converting means, for separating each of said first and second video signals into red, green, and blue video signal components, respectively, and for passing said video signal components to said converting means.

8. A video device according to claim 1, wherein said control means comprises:

third storage means for storing mask data corresponding to each pixel to be displayed on said monitor;

third loading means for loading said mask data into said third storage means; and third unloading means for unloading said mask data from said third storage means and for selecting said first or said second pixel data signal for each pixel to be displayed on said monitor.

9. A method for providing, for display on a monitor, a composite video image formed from first and second video signals comprising the steps of:

(a) receiving said first and second video signals, each of said first and second signals representing a plurality of lines of video data;

(b) converting said first video signal into first pixel data signals and into a control signal;

(c) converting said second video signal into second pixel data signals;

(d) loading said first and second pixel data signals into first and second buffers at a first and second frequency, respectively, such that said first pixel data signals are loaded into said first buffer independently of said second pixel data signals being loaded into said second buffer;

(e) forming an output signal representing the composite video image from portions of first and second pixel data signals stored in said first and second buffers selected according to the control signal, the output signal having an output frequency set according to a timing control signal which is independent of at least one of said first and second frequencies; and (f) generating the timing control signal.

10. The method of claim 9 further including the step of loading the control signal into a third buffer.

11. The method of claim 10 wherein said output signal comprises a plurality of pixel data signals and wherein said control signal indicates, for each of the output signal pixel data signals, whether the origin of such signal should be the first or second pixel data signals, and wherein said output signal forming step includes the substep of outputting said control signal from said third buffer to control the selection of the first or second pixel data signals.

12. The method of claim 9 wherein the step of generating the timing control signal includes the substep of generating said timing control signal from said first or second video signals.

* * * * *

UNITED STATES PATENT AND TRADEMARK OFFICE
CERTIFICATE OF CORRECTION

PATENT NO.   : 4,994,914
DATED        : February 19, 1991
INVENTOR(S)  : John Wiseman et al.

It is certified that error appears in the above-identified patent and that said Letters Patent is hereby corrected as shown below:

Abstract, line 3, change "respresents" to --represents--.

Abstract, line 12, change "frequenices" to --frequencies--.

Claim 2, column 7, line 25, change "convertor" to --converter--.

Claim 9, column 8, line 15, after "method" change "for" to --of--.

Signed and Sealed this

Tenth Day of November, 1992

Attest:

DOUGLAS B. COMER

*Attesting Officer*     Acting Commissioner of Patents and Trademarks